(12) United States Patent
Zipagan (10) Patent No.: US 7,265,960 B2
(45) Date of Patent: Sep. 4, 2007

(54) TRIP COIL DRIVE CIRCUIT AND ELECTRICAL SWITCHING APPARATUS INCLUDING THE SAME

(75) Inventor: Ronald T. Zipagan, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 485 days.

(21) Appl. No.: 10/858,649

(22) Filed: Jun. 2, 2004

(65) Prior Publication Data

US 2005/0270717 A1     Dec. 8, 2005

(51) Int. Cl.
*H02H 3/00*     (2006.01)
(52) U.S. Cl. ......................... 361/115; 361/62
(58) Field of Classification Search ............ 361/42–50, 361/62–69, 115
See application file for complete search history.

(56) References Cited

U.S. PATENT DOCUMENTS

| | | | |
|---|---|---|---|
| 3,906,335 A * | 9/1975 | Watanabe et al. ............. | 363/35 |
| 3,947,728 A | 3/1976 | Smith | |
| 4,017,698 A | 4/1977 | Kuhn et al. | |
| 4,210,956 A * | 7/1980 | Watanabe ..................... | 363/51 |
| 5,541,800 A * | 7/1996 | Misencik ...................... | 361/45 |
| 5,822,165 A | 10/1998 | Moran | |
| 5,917,711 A * | 6/1999 | Shikata et al. ................ | 363/16 |
| 6,459,554 B1 | 10/2002 | Meiners et al. | |
| 2002/0080635 A1* | 6/2002 | Yasumura .................... | 363/97 |

OTHER PUBLICATIONS

Eaton Electrical, Inc., "Capacitor Trip Device" Model CTD-5, Mar. 1999, 2 pp.

* cited by examiner

*Primary Examiner*—Stephen W. Jackson
*Assistant Examiner*—Danny Nguyen
(74) *Attorney, Agent, or Firm*—Martin J. Moran (57) ABSTRACT

A drive circuit, such as an electronic trip device, is for a shunt trip coil of a network protector. The drive circuit includes an alternating current input adapted to receive an alternating current voltage and a first half-wave rectifier adapted to provide a plurality of direct current voltages from the alternating current input. An energy store, such as a plurality of electrolytic capacitors, is adapted to provide a first direct current output from the direct current voltages of the first half-wave rectifier. A sensor circuit monitors the alternating current input and the first direct current output and provides a second output from one of the alternating current input and the first direct current output. A second full-wave rectifier responds to the second output and the trip signal to provide a third direct current output adapted to drive the network protector shunt trip coil.

18 Claims, 5 Drawing Sheets

[TRIP COIL DRIVE CIRCUIT AND
ELECTRICAL SWITCHING APPARATUS
INCLUDING THE SAME

BACKGROUND OF THE INVENTION

1. Field of the Invention

This invention pertains generally to electrical switching apparatus and, more particularly, to network protectors. The invention also pertains to a trip coil drive circuit for a network protector.

2. Background Information

Electric power distribution networks, which supply power to a specified area such as, for example, a section of a city, an industrial complex or a large building, are fed at multiple points through feeders, each of which includes a network protector.

A network protector is a circuit breaker adapted to trip and open the feeder upon detection of reverse power flow, that is, power flowing through the feeder out of the network rather than into the network. Typically, overcurrent protection is provided by other devices, such as fuses in series with the network protector.

The network protector is energized by the voltage on the network at the point of connection of the network protector. Standards require that the network protector be able to trip at network voltages as low as 7% of rated voltage. Conventional network protectors have been able to accommodate sufficiently large trip actuator coils having an impedance capable of limiting coil current at the high end of the voltage range while still being able to operate at the low end.

A known network protector trip circuit includes a half-wave rectifier diode and a single capacitor that provides direct current power to the shunt trip coil of the network protector, in order to trip open the same. When either of the rectifier diode or the capacitor fails, the network protector fails to trip open. The failure of the network protector to open, especially during a primary fault, can be destructive to the network protector and to the corresponding feeder transformer, cables and related equipment. For example, the heat generated during such a fault is proportional to the square of the fault current. Such fault current typically runs in magnitudes of thousands of amperes, thereby causing thermal breakdown on all connected equipment or adjacent equipment due to excessive generated heat. In turn, explosion and fire can cause destruction and excessive damage.

There is a need, therefore, for an improved, increased reliability network protector and trip coil drive circuit.

Accordingly, there is room for improvement in electrical switching apparatus and trip coil drive circuits for electrical switching apparatus.

SUMMARY OF THE INVENTION

These needs and others are met by the present invention, which provides, for example, a quadruple-redundant direct current source, including three bulk storage capacitors, three corresponding fuse and diode isolation circuits, and an alternating current to direct current converter, in order to ensure operation when the stored energy of the bulk storage capacitors fails to provide necessary power to operate a shunt trip coil. In the event that any one, two or all three of the bulk storage capacitors fails for any reason (e.g., become shorted, open or the like), then the corresponding fuse and diode isolation circuit isolates the failed capacitor, thereby not affecting the other capacitors and not affecting the operation of the entire circuit.

In accordance with one aspect of the invention, a drive circuit for a trip coil of an electrical switching apparatus comprises: an alternating current input adapted to receive an alternating current voltage; a first rectifier adapted to provide at least one direct current voltage from the alternating current input; an energy store adapted to provide a first direct current output from the at least one direct current voltage of the first rectifier; a circuit monitoring the alternating current input and the first direct current output and providing a second output from one of the alternating current input and the first direct current output; and a second rectifier responsive to the second output and an electrical switching apparatus trip signal to provide a third direct current output adapted to drive the trip coil of the electrical switching apparatus.

The energy store may comprise a plurality of capacitors, and the first rectifier may comprise a rectifier diode for each of the capacitors. The first rectifier may further comprise an input isolation fuse and an output isolation diode for each of the capacitors, in order that when a corresponding one of the capacitors is shorted, the input isolation fuse isolates the corresponding one of the capacitors from the alternating current input and the output isolation diode isolates the corresponding one of the capacitors from the first direct current output.

The circuit monitoring the alternating current input and the first direct current output may comprise a first sensor monitoring the alternating current input, a second sensor monitoring the first direct current output, a first contact responsive to the first sensor for outputting the alternating current voltage of the alternating current input to a node when the alternating current voltage is above a first predetermined value and for disconnecting the alternating current voltage from the node when the alternating current voltage is below the first predetermined value, and a second contact responsive to the second sensor for outputting the first direct current output to the second output when the direct current voltage of the direct current output is above a second predetermined value, for disconnecting the first direct current output from the second output when the direct current voltage is below the second predetermined value, and for electrically connecting the node to the second output when the direct current voltage is below the second predetermined value.

The circuit monitoring the alternating current input and the first direct current output may further comprise a third contact responsive to the first sensor for outputting the direct current voltage of the first direct current output to the second sensor when the alternating current voltage is above the first predetermined value, for disconnecting the direct current voltage from the second sensor when the alternating current voltage is below the first predetermined value, and for outputting the direct current voltage of the first direct current output to the second output when the alternating current voltage is below the first predetermined value.

The second rectifier may comprise a full wave bridge including a first input responsive to the second output, a second input adapted to respond to the trip signal of the electrical switching apparatus and the third direct current output adapted to drive the trip coil of the electrical switching apparatus.

The alternating current input may include an input and an output. The energy store may comprise a plurality of capacitors. The first rectifier may comprise for each of the capacitors a first diode in series with a fuse and a second diode, the series combination of the first diode and the fuse being electrically connected between the output of the alternating current input and a corresponding one of the capacitors, the second diode electrically connected between the corresponding one of the capacitors and the first direct current output.

As another aspect of the invention, an electrical switching apparatus for a protected electric power distribution network comprises: separable contacts adapted to connect a voltage source to the electric power distribution network; an operating mechanism adapted to open the separable contacts when actuated; a trip coil adapted to actuate the operating mechanism when energized; a control relay responsive to power flow through the separable contacts and adapted to generate a trip signal in response to detection of power flow out of the electric power distribution network through the separable contacts; and a drive circuit comprising: an alternating current input adapted to receive the alternating current voltage, a first rectifier adapted to provide at least one direct current voltage from the alternating current input, an energy store adapted to provide a first direct current output from the at least one direct current voltage of the first rectifier, a circuit monitoring the alternating current input and the first direct current output and providing a second output from one of the alternating current input and the first direct current output, and a second rectifier responsive to the second output and the trip signal of the control relay to provide a third direct current output adapted to drive the trip coil.

The alternating current input may include an input and an output. The energy store may comprise a plurality of capacitors. The first rectifier may comprise for each of the capacitors a first diode in series with a fuse and a second diode, the series combination of the first diode and the fuse being electrically connected between the output of the alternating current input and a corresponding one of the capacitors, the second diode electrically connected between the corresponding one of the capacitors and the first direct current output.

The first diode may include a cathode electrically connected to the corresponding one of the capacitors. The second diode may include an anode electrically connected to the corresponding one of the capacitors and a cathode electrically connected to the first direct current output.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a network protector, although the invention is applicable to a wide range of electrical switching apparatus, such as, for example, circuit breakers.

Examples of network protectors are disclosed in U.S. Pat. Nos. 6,459,554; 5,822,165; and 3,947,728, which are incorporated by reference herein.

Figure 1:
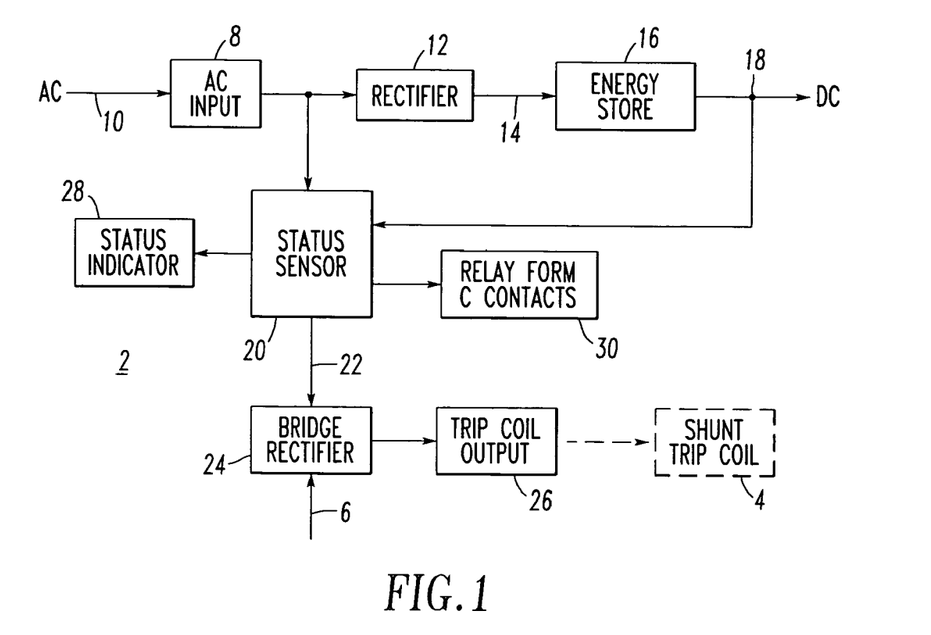
FIG. 1 is a block diagram of a network protector electronic trip device in accordance with the present invention.

Referring to FIG. 1, a drive circuit (e.g., a network protector electronic trip device) 2 is driving a trip coil, such as a network protector shunt trip coil 4, in response to a trip signal, such as a control relay trip contact 6. The drive circuit 2 includes an alternating current input 8 adapted to receive an alternating current (AC) voltage 10, a first rectifier 12 adapted to provide at least one direct current voltage 14 from the alternating current input 8, and an energy store 16 adapted to provide a first direct current (DC) output 18 from the at least one direct current voltage 14 of the first rectifier 12. A status sensor circuit 20 monitors the alternating current input 8 and the first direct current output 18 and provides a second output 22 from one of the alternating current input 8 and the first direct current output 18. A second rectifier, such as bridge rectifier 24, is responsive to the second output 22 of the status sensor circuit 20 and to the trip signal 6, in order to provide a third direct current output 26 adapted to drive the network protector shunt trip coil 4.

Although not shown in FIG. 1, the alternating current input 8 may include suitable optional signal conditioning and surge protection circuitry, the first rectifier 12 may include optional multiple rectifiers and short circuit protection circuitry, and the energy store 16 may include optional multiple energy banks and surge protection circuitry. Although not required, the status sensor circuit 20 may include one or both of a local status indicator 28 and relay form C contacts 30 for remote status indication (e.g., when a fault, such as, for example, a short circuit between terminal numbers 7 and 12 of FIG. 2, occurs or when internal components of the drive circuit 2 fail, such as, for example, one or more of the capacitors 80-1, 80-2, 80-3 of FIG. 4).

Figure 2:
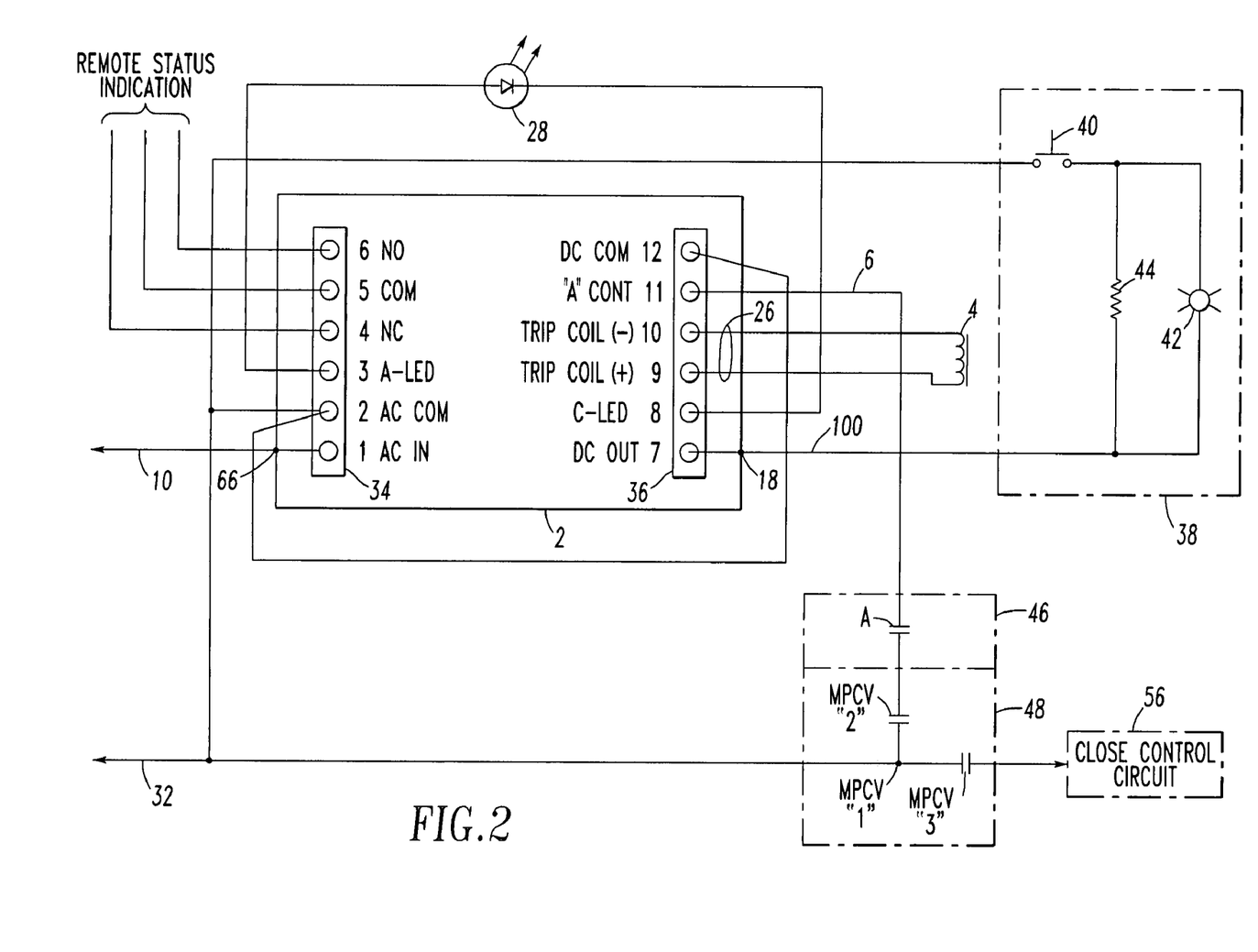
FIG. 2 is a connection diagram showing related equipment and interfaces between the network protector electronic trip device of FIG. 1 and a network protector shunt trip coil.

FIG. 2 shows the electrical connections between the drive circuit 2 of FIG. 1 and the network protector shunt trip coil 4. In this example, the alternating current voltage 10 is about 216 $VAC_{RMS}$ as referenced to an AC common line 32. The drive circuit 2 includes two six-terminal blocks 34,36 for which signal names and terminal numbers (e.g., 1-12), which are not to be confused with reference characters, are shown for convenience of illustration. For example, the status indicator 28 (e.g., a light emitting diode) is electrically connected between one terminal (A-LED) of terminal block 34 and one terminal (C-LED) of terminal block 36. The trip coil 4 is electrically connected to two terminals (TRIP COIL (+) and TRIP COIL (−)) of terminal block 36. A discharge circuit 38 is electrically connected between one terminal (AC COM) of terminal block 34 and one terminal (DC OUT) of terminal block 36, which provides the first direct current output 18 of FIG. 1. Whenever the pushbutton 40 is depressed, the presence of the direct current voltage 100 at the first direct current output 18 is indicated by illuminating lamp 42. At the same time, the voltage 100 at the first direct current output 18 may be discharged through the resistor 44 for maintenance purposes.

The trip signal 6 is provided to the drive circuit 2 from two network protector circuits 46,48. The circuit 46 provides an auxiliary contact (A) that is closed when the separable contacts 50 (FIG. 6) of the network protector 52 (FIG. 6) are closed. The circuit 48 includes a first contact (MPCV "2"), which is closed when the network protector control relay 54 (FIG. 6) determines a trip condition, and a second contact (MPCV "3"), which is closed to provide a close signal to the network protector close circuit 56. The two contacts of the circuit 48 are referenced to the AC common line 32 (at MPCV "1").

Figure 3:
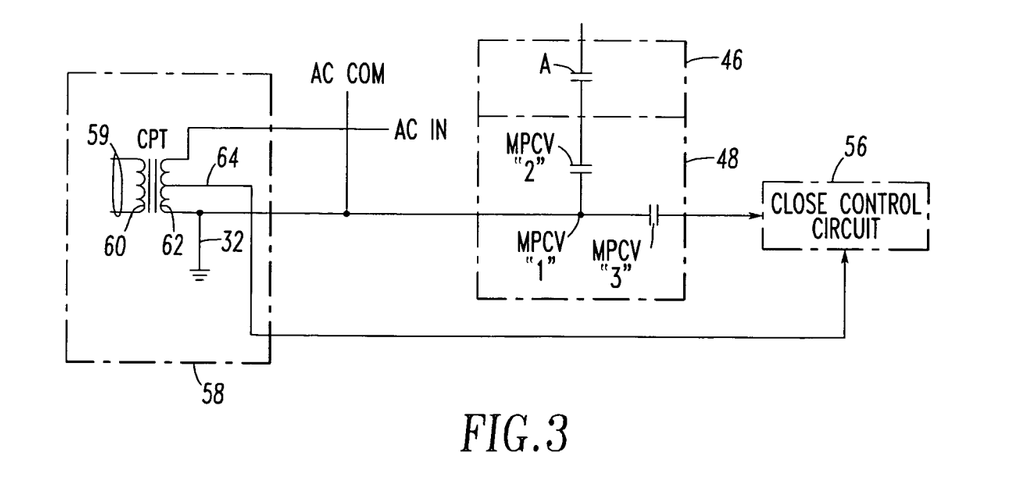
FIG. 3 is a connection diagram showing an alternative power source for the network protector electronic trip device of FIG. 1.

FIG. 3 shows an alternative power source 58 for the drive circuit 2 of FIGS. 1 and 2. Here, the alternating current voltage 59 input by the transformer primary 60 is about 480 $VAC_{RMS}$. The transformer secondary 62 provides about 216 $VAC_{RMS}$ (AC IN) as referenced to the AC common line 32, and a tap output 64, which provides about 125 $VAC_{RMS}$ to the network protector close control circuit 56. Otherwise, the connections for the drive control circuit 2 are as shown in FIG. 2.

Figure 4:
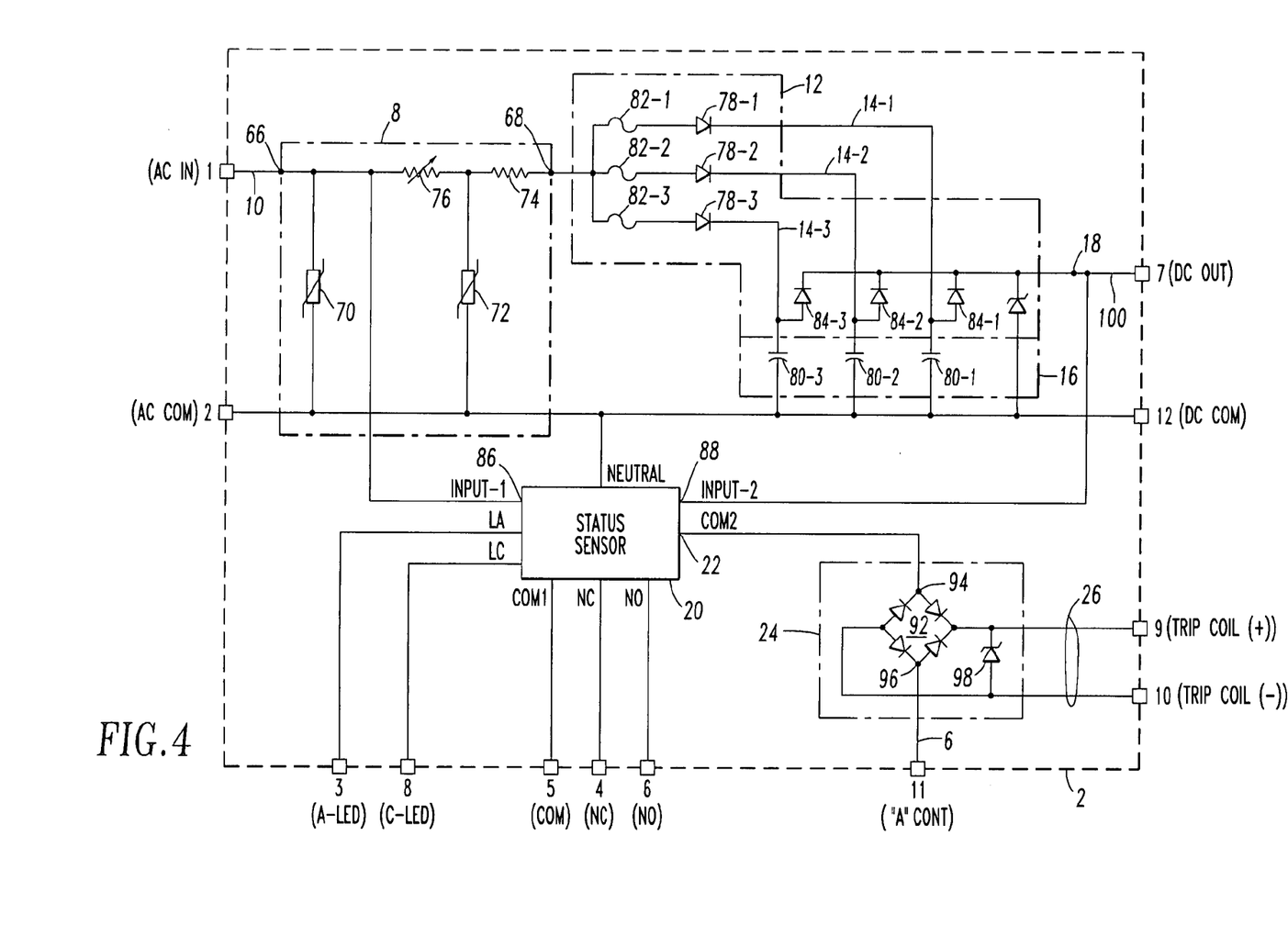
FIG. 4 is a block diagram in schematic form of the network protector electronic trip device of FIG. 1.

FIG. 4 show the drive circuit 2 of FIG. 1. Again, the signal names and terminal numbers (e.g., 1-12), which are not to be confused with reference characters, are shown for convenience and consistency of illustration. The alternating current input 8 includes an input 66 adapted to receive the alternating current voltage 10 (FIG. 1) and an output 68. Two MOVs 70,72 filter (e.g., provide transient protection from input line alternating current voltage surges) the alternating current voltage 10 at the output 68. A resistor 74 and a variable resistor, such as thermistor 76, suitably limit the current flowing between the input 66 and the output 68.

The first rectifier 12 includes a plurality of diodes 78-1, 78-2,78-3, and the energy store 16 includes a plurality of corresponding capacitors 80-1,80-2,80-3. Although three diodes and three corresponding capacitors are shown, the invention is applicable to one, two, three, four or more pairs of such diodes and capacitors. As will be explained, the diodes 78-1,78-2,78-3 correspond to the respective capacitors 80-1,80-2,80-3.

In accordance with a preferred practice of the invention, the first rectifier 12 may also include input isolation fuses 82-1,82-2,82-3 and output isolation diodes 84-1,84-2,84-3 for the capacitors 80-1,80-2,80-3, respectively. In this manner, if any one (e.g., 80-1) of these capacitors fails (e.g., becomes shorted), then the corresponding input isolation fuse (e.g., 82-1) isolates that corresponding capacitor from the alternating current input 8. Also, the corresponding output isolation diode (e.g., 84-1) isolates the corresponding capacitor from the first direct current output 18. For example, the diode 78-1 is in series with the fuse 82-1 and the diode 84-1. The series combination of the diode 78-1 and the fuse 82-1 is electrically connected between the output 68 of the alternating current input 8 and the corresponding capacitor 80-1. The diode 84-1 is electrically connected between that corresponding capacitor 80-1 and the first direct current output 18.

The status sensor circuit 20 includes a first input 86 (Input-1) of the partially filtered input 66 of the alternating current input 8, a second input 88 (Input-2) of the first direct current output 18, and the output 22 (Com2) to the second rectifier 24. As will be discussed below in connection with FIG. 5, the status sensor circuit 20 directs one of the inputs 86,88 to the output 22 and to the second rectifier 24. The status sensor circuit 20 continuously monitors the input alternating current voltage 10 (FIG. 1) and the output direct current voltage 100 from the first direct current output 18. When either the input alternating current voltage 10 or the output direct current voltage 100 falls below respective minimum threshold levels, then back up direct current power remains available to energize the shunt trip coil 4 (FIGS. 1 and 2).

The second rectifier 24 includes a full wave bridge 92 having a first input 94 responsive to the status sensor circuit output 22, a second input 96 adapted to respond to the network protector trip signal 6 and the third direct current output 26 adapted to drive the network protector shunt trip coil 4 (FIGS. 1 and 2).

In accordance with preferred practices, the drive circuit 2 may be protected against inadvertent output short circuits (e.g., of output 18 when resistor 44 becomes shorted or is installed with an improper relatively lower resistance value, or when pushbutton 40 is continuously pressed) by the resistor 74, the thermistor 76 and the fuses 82-1,82-2,82-3. The full wave bridge 92 is preferably protected from inductive kick back from the shunt trip coil 4 (FIGS. 1 and 2) by a zener diode 98.

The drive circuit 2 is energized through the input terminals (AC IN and AC COM). The alternating current voltage 10 (FIG. 1) is filtered and then rectified by the three half wave rectifier diodes 78-1,78-2,78-3. Each of the three separate rectified direct current voltages 14-1,14-2,14-3 is filtered by the three electrolytic capacitors 80-1,80-2,80-3, respectively. At, for example, 216 VACRMs input, the nominal direct current output voltage 100 at the first direct current output 18 is about 290 VDC across DC output terminals (DC OUT and DC COM). While the AC input power is available, each of the capacitors 80-1,80-2,80-3 is continuously charged, thereby providing energy for normal trip operation. In the event of alternating current input power loss, then the direct current power for the shunt trip coil trip operation is always and immediately available from those capacitors. When the alternating current input power returns, then each one of the capacitors 80-1,80-2,80-3 automatically recharges to full direct current voltage and is ready to supply direct current power for the next shunt trip coil trip operation. The drive circuit 2 provides a reliable source of direct current (DC) power to the shunt trip coil 4 (FIGS. 1 and 2) during normal operation or during loss of alternating current (AC) power to the drive circuit 2.

Figure 5:
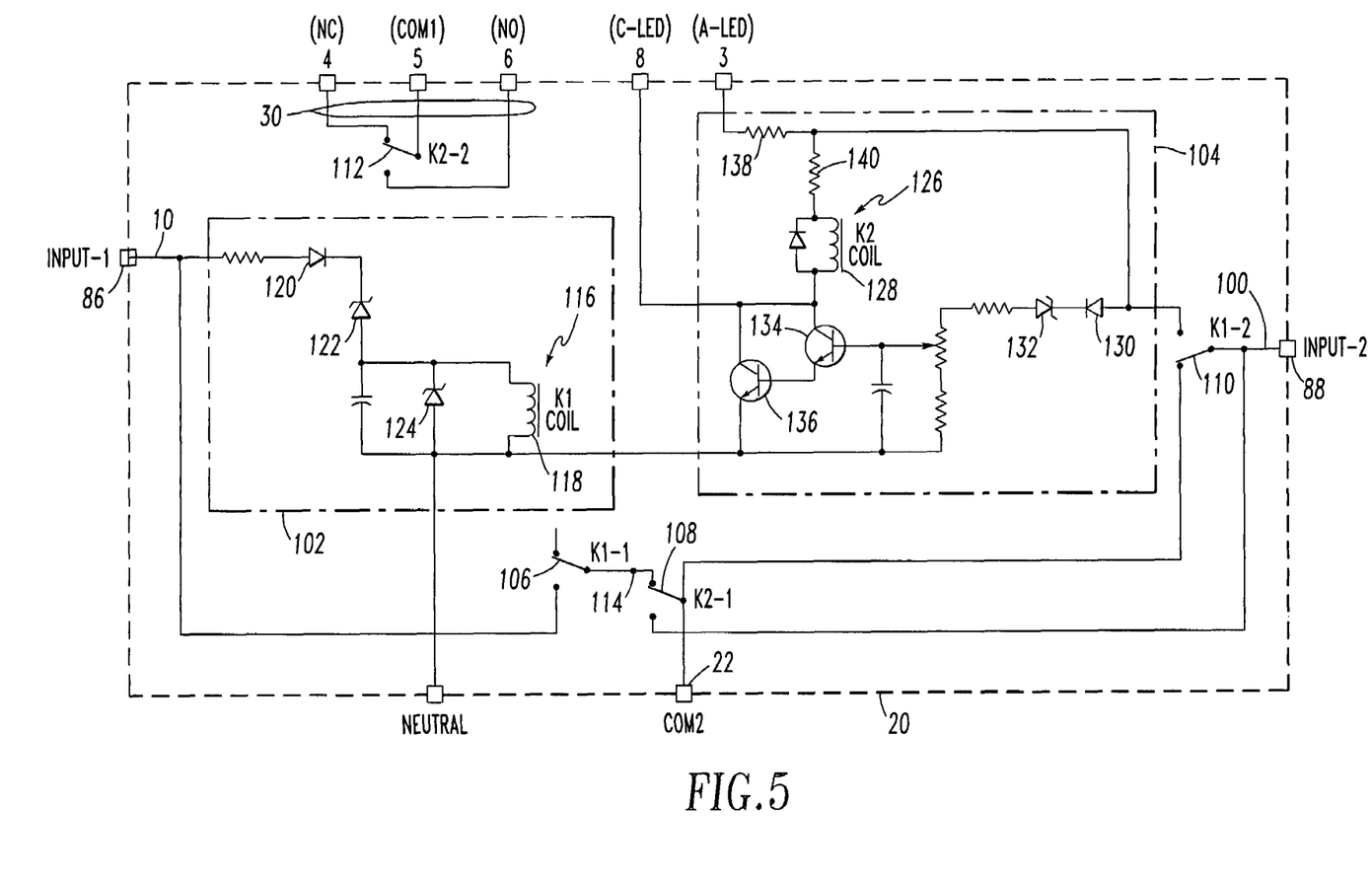
FIG. 5 is a block diagram in schematic form of the status sensor circuit of FIG. 4.

FIG. 5 shows the status sensor circuit 20 of FIG. 4, which monitors the input 66 of the alternating current input 8 of FIG. 2 and the first direct current output 18 of FIGS. 1 and 2. Again, the signal names and terminal numbers (e.g., 3-6 and 8), which are not to be confused with reference characters, are shown for convenience and consistency of illustration. The status sensor circuit 20 includes a first sensor 102 adapted to monitor the alternating current input 8 (FIGS. 1 and 2), a second sensor 104 adapted to monitor the first direct current output 18 (FIGS. 1 and 2), and four contacts 106 (K1-1), 108 (K2-1), 110 (K1-2) and 112 (K2-2).

The first contact 106 (K1-1) is responsive to the first sensor 102 for outputting the alternating current voltage 10 of the alternating current input 8 (FIGS. 1 and 2) from the first input 86 (Input-1) to a node 114 when that alternating current voltage is above a first predetermined value (e.g., without limitation, about 140 $VAC_{RMS}$) and for disconnecting that alternating current voltage from such node when such alternating current voltage is below the first predetermined value. The second contact 108 (K2-1) is responsive to the second sensor 104 for outputting the first direct current output 18 (FIGS. 1 and 2) from the second input 88 (Input-2) to the second output 22 (Com2) when the direct current voltage 100 is above a second predetermined value (e.g., without limitation, about 170 to about 180 VDC), for disconnecting that first direct current output 18 from that second output 22 when that direct current voltage 100 is below that second predetermined value, and for electrically connecting the node 114 to the second output 22 when that direct current voltage 100 is below that second predetermined value.

The third contact 110 (K1-2) is responsive to the first sensor 102 for outputting the direct current voltage 100 of the first direct current output 18 (FIGS. 1 and 2) at the second input 88 (Input-2) to the second sensor 104 when the alternating current voltage 10 is above the first predetermined value, for disconnecting the direct current voltage 100 from the second sensor 104 when the alternating current voltage 10 is below the first predetermined value, and for outputting the direct current voltage 100 to the second output 22 when the alternating current voltage 10 is below the first predetermined value.

The fourth contact 112 (K2-2) is responsive to the second sensor 104 and provides the relay form C contacts 30 (FIG. 1) for remote status indication.

The first sensor 102 includes a relay 116 having a coil 118 (K1 Coil) that is energized when the alternating current voltage 10 exceeds the first predetermined value as generally established by the series combination of diode 120, zener diode 122 and zener diode 124. When the coil 118 is energized, the corresponding contacts 106 (K1-1) and 110 (K1-2) move from their normally closed positions (as shown in FIG. 5). Hence, contact 106 (K1-1) electrically connects the alternating current voltage 10 at the first input 86 (Input-1) to the node 114, and contact 110 (K1-2) electrically connects the direct current voltage 110 at the second input 88 (Input-2) to the second sensor 104.

The second sensor 104 includes a relay 126 having a coil 128 (K2 Coil) that is energized when the direct current voltage 100 exceeds the second predetermined value as generally established by the series combination of diode 130, zener diode 132 and the base-emitter junctions of transistors 134,136. When the coil 128 is energized, the corresponding contacts 108 (K2-1) and 112 (K2-2) move from their normally closed positions (as shown in FIG. 5). Hence, contact 108 (K2-1) electrically connects the direct current voltage 100 at the second input 88 (Input-2) to the second output 22, and contact 112 (K2-2) electrically connects the common terminal (Com1) to the normally open terminal (NO).

The status sensor circuit 20 monitors both the alternating current voltage 10 and the direct current voltage 100. The coil 128 (K2 Coil) of the alarm relay 126 is normally energized when both the alternating current voltage 10 and the direct current voltage 100 are above the first and second predetermined values, respectively. If either of the alternating current voltage 10 or the direct current voltage 100 fall below their respective predetermined fault levels, then the alarm relay coil 128 (K2 coil) de-energizes and its output contacts 108,112 (K2-1,K2-2) change state. Simultaneously, if the first relay coil 118 (K1 coil) remains energized as a result of a sufficient value of the alternating current voltage 10, then the shunt trip coil 4 (FIG. 1) is switched to backup direct current power, as provided from the alternating current voltage 10, through the closed contact 106 (K1-1), through the node 114, through the normally closed contact 108 (K2-1), through the second output 22, and through the full-wave rectifier 92 (FIG. 4), in order to provide an uninterrupted energy supply at the third direct current output 26 (FIG. 4) to the trip coil 4 (FIG. 1).

As can be seen from FIGS. 2 and 5, the LED indicator 28 is adapted to indicate when the direct current voltage 100 is above the second predetermined value and when the alternating current voltage 10 is above the first predetermined value, since both of the relay coils 118,128 are energized.

The LED indicator 28 is electrically connected in parallel with the relay coil 128 and is suitably energized therewith through the resistor 138. Hence, under normal power conditions, the LED indicator 28 (FIG. 2) is illuminated and, otherwise, turns off when the alarm relay coil 128 (K2 coil) de-energizes.

Figure 6:
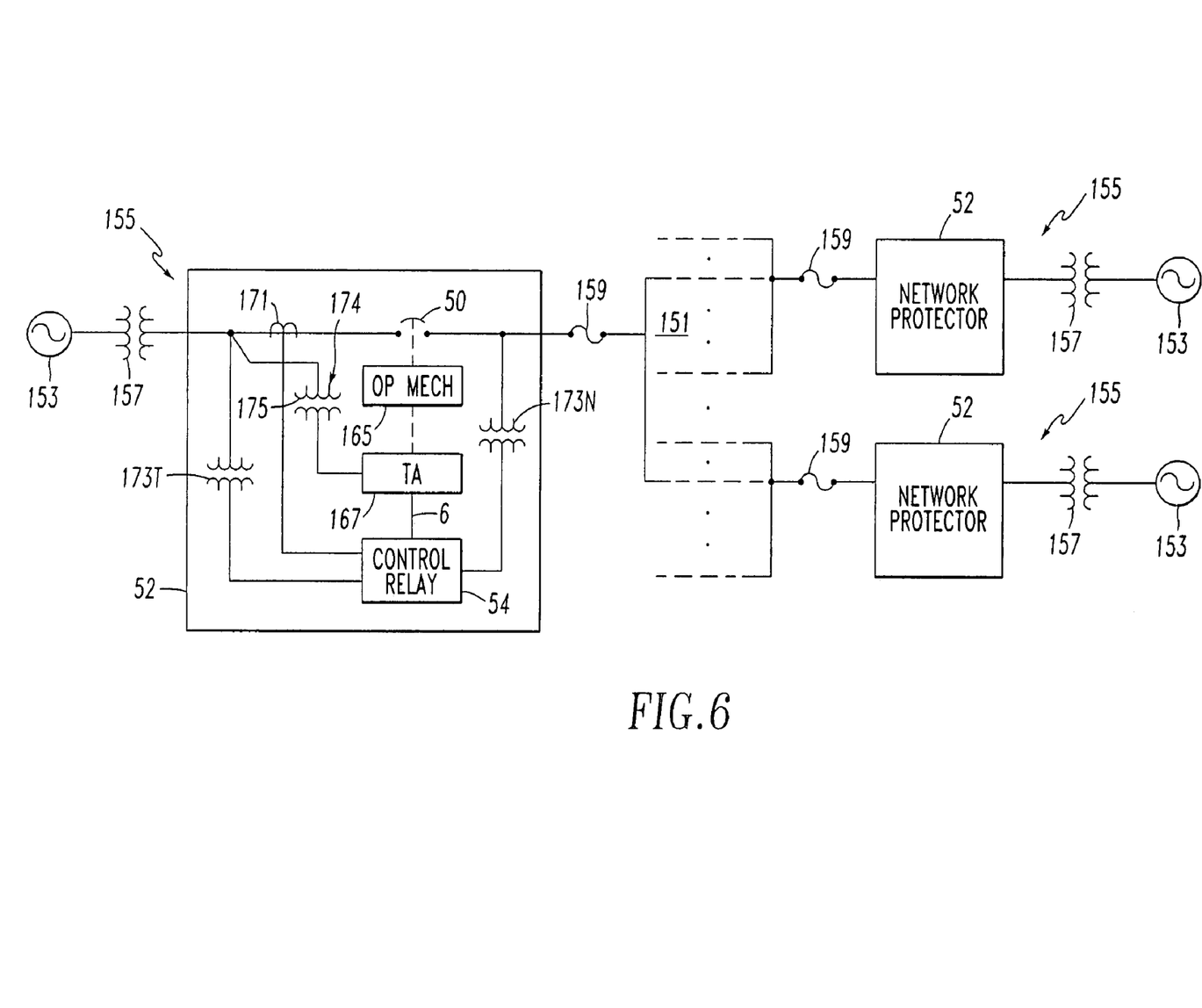
FIG. 6 is a block diagram in schematic form of an electric power distribution network protected by network protectors incorporating the network protector electronic trip device of FIG. 1.

Referring to FIG. 6, an electric power distribution network 151 is fed by a number of sources 153 through feeders 155. Each of the feeders 155 has a transformer 157, a fuse 159 and one of the network protectors 52. The fuses 159 provide overcurrent protection while the network protectors 52 provide protection against reverse flow of power from the network 151 toward the sources 153. The electric power distribution network 151 is a three phase system and hence the components described to this point are also three phase, although shown in single line form for clarity.

The network protectors 52 include the separable contacts 50 which are automatically opened by an operating mechanism 165. The operating mechanism 165 is actuated by a trip actuator assembly 167, which is based upon the drive circuit 2 and the shunt trip coil 4 of FIG. 1, when energized in response to the trip signal 6 from the control relay 54. The control relay 54 monitors the current in the feeder 155 through current transformer 171.

Two potential transformers 173T and 173N are electrically connected to the control relay 54 from the transformer side and the network side, respectively, of the network protector 52. The network transformer 157 steps down the voltage from the source 153. The control relay 54, thus, employs power from both sides of the network protector 52, in order to determine the differential voltage (i.e., phasing voltage) and angle necessary to initiate a close operation. When the separable contacts 50 are open, voltage is available at the network side of the network protector 52 through the fuse 159.

For a 480 $VAC_{RMS}$/270 $VAC_{RMS}$ application, a CPT transformer 174 (e.g., of the power source 58 of FIG. 3) powers the trip actuator (TA) assembly 167. The transformer primary 175 is electrically connected to the transformer side of the network protector 52.

For a 216 $VAC_{RMS}$/125 $VAC_{RMS}$ application (not shown), the TA assembly 167 is powered directly from the transformer side of the network protector 52, and the control relay 54 is directly electrically connected to the transformer and network sides of the network protector 52. Here, the transformers 173T, 173N, 174 are not employed.

EXAMPLE 1

Preferably, the drive circuit 2 of FIG. 4 employs a NEMA 4X sealed enclosure (not shown) in order to prevent, for example, intrusion of liquid or gas contaminants. The enclosure may be submergible and waterproof to about, for example, a 15 foot depth.

EXAMPLE 2

The energy store 16 of the drive circuit 2 of FIG. 4 employs a triple-redundant backup direct current circuit and a self-isolating mechanism through the diodes 84-1,84-2, 84-3 and the fuses 82-1,82-2,82-3 when any one or all of the capacitors 80-1,80-2,80-3, respectively, become defective.

EXAMPLE 3

The status sensor circuit 20 of the drive circuit 2 of FIG. 4 may provide built-in malfunction sensors 102,104 that provide remote notification via relay form C contacts 30 when the power components of the drive circuit 2 fail or when an external fault (e.g., loss of the alternating current voltage 10) occurs.

EXAMPLE 4

The drive circuit 2 preferably provides relatively robust overload and transient protection against direct current output short circuits, inductive kick back from shunt trip coil 4 and input alternating current line surges.

While for clarity of disclosure reference has been made herein to the exemplary LED indicator 28 for displaying status information and the relay form C contacts 30 for remotely communicating status information, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A drive circuit for a trip coil of an electrical switching apparatus including a trip signal, said drive circuit comprising:
   an alternating current input adapted to receive an alternating current voltage;
   a first rectifier adapted to provide at least one direct current voltage from said alternating current input;
   an energy store adapted to provide a first direct current output from the at least one direct current voltage of said first rectifier;
   a circuit monitoring said alternating current input and said first direct current output and providing a second output from one of said alternating current input and said first direct current output;
   a second rectifier responsive to said second output and said trip signal to provide a third direct current output adapted to drive the trip coil of said electrical switching apparatus; and
   wherein said first direct current output has a direct current voltage; and wherein said circuit monitoring said alternating current input and said first direct current output comprises a first sensor monitoring said alternating current input, a second sensor monitoring said first direct current output a first contact responsive to said first sensor for outputting the alternating current voltage of said alternating current input to a node when said alternating current voltage is above a first predetermined value and for disconnecting said alternating current voltage from said node when said alternating current voltage is below said first predetermined value, and a second contact responsive to said second sensor for outputting said first direct current output to said second output when said direct current voltage is above a second predetermined value, for disconnecting said first direct current output from said second output when said direct current voltage is below said second predetermined value, and for electrically connecting said node to said second output when said direct current voltage is below said second predetermined value.

2. The drive circuit of claim 1 wherein said circuit monitoring said alternating current input and said first direct current output further comprises a third contact responsive to said first sensor for outputting the direct current voltage of said first direct current output to said second sensor when said alternating current voltage is above said first predetermined value, for disconnecting said direct current voltage from said second sensor when said alternating current voltage is below said first predetermined value, and for outputting the direct current voltage of said first direct current output to said second output when said alternating current voltage is below said first predetermined value.

3. The drive circuit of claim 2 wherein said circuit monitoring said alternating current input and said first direct current output fbrther comprises a relay including a coil and at least one contact, and a circuit responsive to said first direct current output and adapted to energize the coil of said relay when said direct current voltage is above said second predetetmined value.

4. The drive circuit of claim 3 wherein daid circuit monitoring said alternating current input and said first direct current output further comprises an indicator adapted to indicate when said direct current voltage is above said second predetermined value and when said alternating current voltage is above said first predetermined value, said indicator being electrically connected in series with the coil of said relay.

5. A drive circuit for a trip coil of an electrical switching apparatus including a trip signal, said drive circuit comprising:
   an alternating current input adapted to receive an alternating current voltage;
   a first rectifier adapted to provide at least one direct current voltage from said alternating current input;
   an energy store adapted to provide a first direct current output from the at least one direct current voltage of said first rectifier;
   a circuit monitoring said alternating current input and said first direct current output and providing a second output from one of said alternating current input and said first direct current output;
   a second rectifier responsive to said second output and said trip signal to provide a third direct current output adapted to drive the trip coil of said electrical switching apparatus; and
   wherein said alternating current input includes an input and an output; wherein said energy store comprises a plurality of capacitors; and wherein said first rectifier comprises for each of said capacitors a first diode in series with a fuse and a second diode, the series combination of said first diode and said fuse being electrically connected between the output of said alternating current input and a corresponding one of said capacitors, the second diode electrically connected between the corresponding one of said capacitors and said first direct current output.

6. The drive circuit of claim 5 wherein said alternating current input is adapted to receive an alternating current voltage at the input thereof; and wherein said alternating current input further includes means for filtering said alternating current voltage at the output of said alternating current input.

7. An electrical switching apparatus for a protected electric power distribution network fed by a plurality of voltage sources and including an alternating current voltage, said electrical switching apparatus comprising:

a separable contacts adapted to connect one of the voltage sources to the electric power distribution network;

an operating mechanism adapted to open the separable contacts when actuated;

a trip coil adapted to actuate the operating mechanism when energized;

a control relay responsive to power flow through the separable contacts and adapted to generate a trip signal in response to detection of power flow out of the electric power distribution network through the separable contacts; and a drive circuit comprising:

an alternating current input adapted to receive said alternating current voltage, a first rectifier adapted to provide at least one direct current voltage from said alternating current input, an energy store adapted to provide a first direct current output from the at least one direct current voltage of said first rectifier, a circuit monitoring said alternating current input and said first direct current output and providing a second output from one of said alternating current input and said first direct current output, and a second rectifier responsive to said second output and the trip signal of said control relay to provide a third direct current output adapted to drive said trip coil.

8. The electrical switching apparatus of claim 7 wherein said energy store comprises a plurality of capacitors; and wherein said first rectifier comprises a rectifier diode for each of said capacitors.

9. The electrical switching apparatus of claim 8 wherein said first rectifier further comprises an input isolation fuse and an output isolation diode for each of said capacitors, in order that when a corresponding one of said capacitors becomes shorted, said input isolation fuse isolates said corresponding one of said capacitors from said alternating current input and said output isolation diode isolates said corresponding one of said capacitors from said first direct current output.

10. The electrical switching apparatus of claim 7 wherein said first direct current output has a direct current voltage; and wherein said circuit monitoring said alternating current input and said first direct current output comprises a first circuit monitoring said alternating current input, a second circuit monitoring said first direct current output, a first switch responsive to said first circuit for outputting the alternating current voltage of said alternating current input to a node when said alternating current voltage is above a first predetermined value and for disconnecting said alternating current voltage from said node when said alternating current voltage is below said first predetermined value, and a second switch responsive to said second circuit for outputting said first direct current output to said second output when said direct current voltage is above a second predetermined value, for disconnecting said first direct current output from said second output when said direct current voltage is below said second predetermined value, and for electrically connecting said node to said second output when said direct current voltage is below said second predetermined value.

11. The electrical switching apparatus of claim 10 wherein said circuit monitoring said alternating current input and said first direct current output further comprises a third switch responsive to said first circuit for outputting the direct current voltage of said first direct current output to said second circuit when said alternating current voltage is above said first predetermined value, for disconnecting said direct current voltage from said second circuit when said alternating current voltage is below said first predetermined value, and for outputting the direct current voltage of said first direct current output to said second output when said alternating current voltage is below said first predetermined value.

12. The electrical switching apparatus of claim 7 wherein said circuit monitoring said alternating current input and said first direct current output comprises a relay including a coil and at least one contact, a first circuit monitoring said alternating current input, a second circuit monitoring said first direct current output, said second circuit adapted to energize the coil of said relay when said alternating current voltage is above a first predetermined value and when said direct current voltage is above a second predetermined value.

13. The electrical switching apparatus of claim 12 wherein said circuit monitoring said alternating current input and said first direct current output further comprises a display adapted to display when said direct current voltage is above said second predetermined value and when said alternating current voltage is above said first predetermined value, said display being electrically connected in parallel with the coil of said relay.

14. The electrical switching apparatus of claim 7 wherein said second rectifier comprises a full wave bridge including a first input responsive to said second output, a second input responsive to the trip signal of said control relay and said third direct current output adapted to drive said trip coil.

15. The electrical switching apparatus of claim 7 wherein said alternating current input includes an input and an output; wherein said energy store comprises a plurality of capacitors; and wherein said first rectifier comprises for each of said capacitors a first diode in series with a fuse and a second diode, the series combination of said first diode and said fuse being electrically connected between the output of said alternating current input and a corresponding one of said capacitors, the second diode electrically connected between the corresponding one of said capacitors and said first direct current output.

16. The electrical switching apparatus of claim 15 wherein said first diode includes a cathode electrically connected to the corresponding one of said capacitors; and wherein said second diode includes an anode electrically connected to the corresponding one of said capacitors and a cathode electrically connected to said first direct current output.

17. A drive circuit for a trip coil of an electrical switching apparatus including a trip signal, said drive circuit comprising:

an alternating current input adapted to receive an alternating current voltage;

a first rectifier adapted to provide at least one direct current voltage from said alternating current input;

an energy store adapted to provide a first direct current output from the at least one direct current voltage of said first rectifier;

a circuit monitoring said alternating current input and said first direct current output and providing a second output from one of said alternating current input and said first direct current output;

a second rectifier responsive to said second output and said trip signal to provide a third direct current output adapted to drive the trip coil of said electrical switching apparatus;

wherein said energy store comprises a plurality of capacitors; and wherein said first rectifier comprises a rectifier diode for each of said capacitors; and wherein said first rectifier further comprises an input isolation fuse and an output isolation diode for each of said capacitors, in order that when a corresponding one of said capacitors is shorted, said input isolation fuse isolates said corresponding one of said capacitors from said alternating current input and said output isolation diode isolates said corresponding one of said capacitors from said first direct current output.

18. A drive circuit for a trip coil of an electrical switching apparatus including a trip signal, said drive circuit comprising:

an alternating current input adapted to receive an alternating current voltage;

a first rectifier adapted to provide at least one direct current voltage from said alternating current input;

an energy store adapted to provide a first direct current output from the at least one direct current voltage of said first rectifier;

a circuit monitoring said alternating current input and said first direct current output and providing a second output from one of said alternating current input and said first direct current output;

a second rectifier responsive to said second output and said trip signal to provide a third direct current output adapted to drive the trip coil of said electrical switching apparatus; and wherein said second rectifier comprises a full wave bridge including a first input responsive to said second output, a second input adapted to respond to the trip signal of said electrical switching apparatus and said third direct current output adapted to drive the trip coil of said electrical switching apparatus.

* * * * *